(12) United States Patent
Poertzgen et al.

(10) Patent No.: US 6,394,235 B1
(45) Date of Patent: May 28, 2002

(54) HYDRAULIC VEHICLE BRAKE WITH BLOCKING MEANS AND METHOD FOR OPERATING SAME

(75) Inventors: Gregor Poertzgen, Koblenz; Karl Friedrich Wörsdorfer, Budenheim; Ralf Erben, Kemmenau; Guido Zenzen, Macken, all of (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/489,202

(22) Filed: Jan. 21, 2000

(30) Foreign Application Priority Data

Jul. 25, 1997 (DE) .......................... 197 32 168

(51) Int. Cl.$^7$ .................. F16D 55/26; F16D 65/16; B60T 13/74
(52) U.S. Cl. .................. 188/72.6; 188/72.8; 188/106 F; 303/3; 303/15; 303/192
(58) Field of Search .............................. 188/72.1, 72.9, 188/72.6, 72.7, 72.8, 156, 157, 158, 181 A, 106 F; 303/3, 15, 20, 177, 191, 192, 122, 122.09, 122.1, 122.11, 122.12, 122.13, 122.14, 122.15

(56) References Cited

U.S. PATENT DOCUMENTS

| | | | | |
|---|---|---|---|---|
| 3,093,213 A | * | 6/1963 | Limoges et al. | 303/3 |
| 4,094,555 A | * | 6/1978 | Byrne et al. | 188/181 A |
| 4,793,447 A | | 12/1988 | Taig et al. | 188/72.1 |
| 4,804,073 A | | 2/1989 | Taig et al. | 188/72.1 |

(List continued on next page.)

FOREIGN PATENT DOCUMENTS

| | | |
|---|---|---|
| DE | 19526645 | 1/1997 |
| DE | 19536694 | 4/1997 |
| DE | 19536695 | 4/1997 |
| EP | 0 170 478 A2 * | 2/1986 |
| EP | 372219 | 6/1990 |
| EP | 586598 | 3/1994 |
| WO | 97/12793 | 4/1997 |

OTHER PUBLICATIONS

Automotive Handbook, Robert Bosch GmbH, 4th edition, 1996, pp. 107–110.*

*Primary Examiner*—Christopher P. Schwartz
*Assistant Examiner*—Thomas J. Williams
(74) *Attorney, Agent, or Firm*—MacMillan, Sobanski & Todd, LLC

(57) ABSTRACT

A hydraulic vehicle brake (10) has a hydraulic chamber (16) which sealingly accommodates a brake piston (18) which can slide along an axis (A). The brake piston (18) acts upon a friction member and can be moved by means of hydraulic pressure which is supplied to the hydraulic chamber (16) into an actuating position in which it presses the friction member against a rotor (brake disk, brake drum, etc.). In order to be able to use the vehicle brake (10) besides its function as a hydraulic service brake also as a parking brake, a spindle/nut arrangement (24) is provided which is driven by an electric motor (42) and arranged coaxial to the axis (A) of the brake piston (18), the nut (30) of which arrangement (24) is secured against rotation, and by rotation of the spindle (26) as a function of the sense of rotation can either be moved into contact with the brake piston (18) or be moved away from the brake piston (18) translatorily along the axis (A). For realizing a compact and economical construction, the output shaft (46) of the electric motor (42) extends at a lateral distance parallel to axis (A) and exits the electric motor (42) at the side facing away from the brake piston (18). In addition, a reduction gear (44) with a reduction ratio in the order of 200:1 is connected between the electric motor (42) and the spindle (26), with the electric motor (42) and the reduction gear (44) being designed as a subassembly (40) which can be handled separately.

12 Claims, 2 Drawing Sheets

U.S. PATENT DOCUMENTS

| | | |
|---|---|---|
| 4,836,338 A | 6/1989 | Taig |
| 5,107,967 A | 4/1992 | Fujita et al. |
| 5,139,315 A | 8/1992 | Walenty et al. |
| 5,148,894 A | 9/1992 | Eddy, Jr. .................... 188/72.6 |
| 5,348,123 A | 9/1994 | Takahashi et al. ......... 188/72.1 |
| 5,769,189 A | 6/1998 | Heibel et al. ................ 188/156 |
| 5,788,023 A | 8/1998 | Schöner et al |
| 5,829,557 A | 11/1998 | Halasy-Wimmer et al. ......................... 188/72.7 |
| 5,915,504 A * | 6/1999 | Doricht ....................... 188/158 |
| 6,040,665 A * | 3/2000 | Shirai et al. ................ 188/158 |
| 6,158,822 A * | 12/2000 | Shirai et al. ................ 188/158 |
| 6,176,352 B1 * | 1/2001 | Maron et al. .............. 188/72.1 |
| 6,186,599 B1 * | 2/2001 | Otomo et al. .............. 188/72.1 |
| 6,279,691 B1 * | 8/2001 | Takahashi et al. ......... 188/72.8 |

* cited by examiner

HYDRAULIC VEHICLE BRAKE WITH BLOCKING MEANS AND METHOD FOR OPERATING SAME

BACKGROUND OF THE INVENTION

The invention relates to a hydraulic vehicle brake and to a method for operating same.

From EP 0 729 871 A1 a hydraulic vehicle, brake is known, wherein a friction pad can be pressed against a brake disk by means of a brake piston using hydraulic fluid, in order to brake its rotation. For this purpose, hydraulic fluid is fed under pressure in a conventional, manner into a hydraulic chamber, the boundary wall of which is formed by the brake piston. The pressure in the hydraulic chamber, then leads to a displacement of the brake piston and thus of the friction pad towards the brake disk. In order to enable this known vehicle brake to be used not only as a service brake, but also as a hand brake—also referred to as parking brake—, it comprises a spindle/nut arrangement for mechanically blocking the brake piston in a condition in which the friction pad is in engagement with the brake disk.

SUMMARY OF THE INVENTION

The invention is based on the object to provide a hydraulic vehicle brake which can be used both as a service brake and a parking brake, and the construction of which is more compact than that of the vehicle brake known from EP 0 729 871 A1. In addition, the hydraulic vehicle brake to be provided must be adaptable to various vehicle models in an economical manner.

According to the invention, this object is solved by a hydraulic vehicle brake which comprises the features of the present invention.

The electric motor which rotationally drives the spindle according to the invention is arranged in such a manner that its output shaft which extends at a distance and parallel to the longitudinal center axis of the brake piston exits the electric motor at the side facing away from the brake piston. This arrangement is space saving, in particular with respect to the length of the construction. The reduction gear connected between the electric motor and the spindle with its reduction in the order of 200:1 enables the employment of a small space saving electric motor.

The electric motor and the reduction gear which is coupled with same are designed as a standardized subassembly which can be handled independently and can be combined with various vehicle brakes of one type. Thereby, the production quantities of such a motor/gear unit increase, which has a favorable effect on the unit cost. Moreover, the motor/gear unit designed as an independent assembly enables an attachment at the brake housing in a simple manner in any desired angular position so that spatial restrictions at the installation site of the brake can easily be complied with by a correspondingly different positioning of the subassembly.

The reduction gear is advantageously designed as a planetary gear, a harmonic drive gear, an eccentric disk gear, or a swash plate gear, because these gear types are compact and, at a small weight, have a good efficiency. The reduction gear can be designed to be single-stage, but also multistage, in particular, two-stage. A two-stage gear is particularly advantageous with respect to saving installation space, one stage of which is formed by one of the previously mentioned gear types with a reduction in the range of 50:1, upstream or downstream of which a second stage with a reduction in the range of 4:1 is connected, so that an overall reduction in the range of 200:1 is achieved. In a multistage reduction gear, in particular in a two-stage reduction gear, preferably the stage with the lower reduction is designed as a simple spur gear or, more advantageously, as a belt gear, in particular, as a toothed-belt gear. The use of a belt gear or a toothed-belt gear results in a particularly good noise decoupling between the driving electric motor and the remaining parts of the vehicle brake, and thus to a comfortable, low-noise operation.

In all embodiments of the vehicle brake according to the invention the spindle/nut arrangement is advantageously designed to be self-locking, generally by a suitable selection of the pitch of a thread which connects the nut with the spindle. A self-locking spindle/nut arrangement allows to dispense with a locking device after the vehicle brake has been locked by rotating the spindle.

The spindle/nut arrangement is preferably arranged in the hydraulic chamber. This leads to a still more compact construction and, moreover, ensures the lubrication of the in spindle/nut arrangement. According to a further development of this embodiment, the brake piston is designed as a hollow piston which is open at one side so that the spindle/nut arrangement is at least partially accommodated in the brake piston in a space-saving manner.

In preferred embodiments of the vehicle brake according to the invention, the translational movement of the nut, which is caused by the rotation of the spindle, is sensed by means of a sensor. In this manner, a predetermined small distance between the brake piston and the nut, and thus an optimum function of the hand brake or the emergency brake, respectively, can be ensured. In practical use with the hand brake or the emergency brake, respectively, not actuated, a distance between the nut and the brake piston of approx. 0.5 mm is desired. A distance between the nut and the brake piston, which remains constant at all times, makes it possible, on the one hand, to achieve the desired maximum clamping force of the hand brake within a short period of time, i.e. within the range of approx. 1 second, and, on the other hand, allows the brake piston to return after an actuation in accordance with the so-called "rollback" principle, and to not contact the nut prematurely, which might result in a residual sliding moment between the friction member and the rotor to be braked. Those with skill in the art understand the "rollback" principle as the resetting of the brake piston following a braking operation, which is caused by the resetting force of the elastomeric seal sealing the brake piston, which seal has been elastically deformed during the braking operation. The mentioned sensor for sensing the translational movement of the nut can, for example, be a sensor which directly senses the travel of the nut. For this purpose resistive sensors, inductive sensors, or capacitive sensors as well, are suitable. In order to improve the brake control, in addition to the sensor sensing the nut's travel, a force sensor sensing the clamping force can be provided which, for example, can be arranged in the or at the friction member, or in the brake piston as well.

The sensor sensing the translational movement of the nut can alternatively be a sensor which measures the revolutions of the output shaft of the electric motor driving the spindle. Instead of measuring the revolutions of the output shaft of the electric motor itself, it is also possible to measure the revolutions of a gearwheel in the downstream reduction gear. For measuring the revolutions, a Hall sensor is particularly suited, which provides a square wave output signal. If such a Hall sensor is aligned, for example, with the teeth of a gearwheel which is coupled with the output shaft of the electric motor, one revolution of the output shaft will correspond to a certain number of square wave pulses, i.e. to the number of teeth of the gearwheel. With the high resolution of the rotational movement of the output shaft of the electric motor, which is achieved in this manner, the translational movement of the nut, which is caused by the rotation of the spindle, can be sensed with a very high accuracy since there is a fixed correlation given by the existing reduction between the revolutions of the electric motor, on the one hand, and the translational movement of the nut, on the other hand. Moreover, a Hall sensor is very well suited for an integration into the already mentioned unit consisting of the electric motor and the reduction gear so that long electrical connections which are therefore potentially more susceptible to failure between the Hall sensor and the electric motor are avoided. A control unit controlling the functional sequences of the vehicle brake according to the invention is advantageously also arranged in the motor/gear unit.

Due to the fact that the clamping force of the brake can be deducted from the time characteristics of the current consumption of the electric motor, the further above mentioned travel sensor or the force sensor as well are no longer necessary, if a Hall sensor or another sensor is provided which directly or indirectly measures the revolutions of the output shaft of the electric motor. This means that it is no longer required to install sensors in the vehicle brake housing itself so that electrical connections are no longer necessary between the vehicle brake proper and the unit consisting of the electric motor and the reduction gear. Thus, merely the mechanical connection between the spindle and the reduction gear exists between the motor/gear unit and the vehicle brake proper.

The vehicle brake according to the invention is further advantageous in that the spindle/nut arrangement which cooperates with the brake piston cannot only be used as a blocking means, but that the spindle/nut arrangement furthermore provides a mechanical emergency actuation by means of which the friction pad can be pressed against the rotating rotor of the brake, e.g. in the case of a failure of the hydraulic actuation. The vehicle brake according to the invention can be designed as a disk brake or a drum brake as well.

In the following, an advantageous method will be described which allows the use of a generic vehicle brake, in which the spindle is driven by means of an electric motor, as a hand brake. For this purpose, the spindle is first rotationally driven in a first sense of rotation by the electric motor in such a manner that the nut of the spindle/nut arrangement is moved towards the brake piston. The characteristics of speed and current consumption of the electric motor are measured as a function of time. If a sudden speed drop and an increase in current consumption corresponding therewith occur, which means that the nut has come into contact with the brake piston, the values of speed and/or current consumption applicable before the speed drop or the increase in current consumption, respectively, are stored in a memory as reference values. The spindle is further rotationally driven in the first sense of rotation until the continued measurement of the current consumption shows that a previously defined maximum value of the current consumption has been reached which corresponds to the desired clamping force. As soon as this value is reached the electric motor will be switched off, and the vehicle brake fulfils its blocking function.

If the hand brake is to be released again, the spindle is driven rotationally counter to the first sense of rotation, and the momentary speed and/or the momentary current consumption of the electric motor are compared with the corresponding reference value which has previously been stored. The point of time in which the momentary speed and/or the momentary current consumption is identical with the corresponding reference value, which is equivalent to the nut clearing the brake piston, is sensed, and the spindle is further rotationally driven counter to the first sense of rotation in order to set a desired distance between the nut and the brake piston, which is mandatory for a satisfactory function of the vehicle brake.

The setting of a desired distance between the nut and the brake piston can be effected, for example, in such a manner that the spindle from the point of time onward in which the momentary speed and/or the momentary current consumption is identical with the corresponding reference value is rotationally driven for a specified period of time counter to the first sense of rotation, with the period of time being specified under consideration of the existing speed reduction of the electric motor in such a manner that the desired distance is exactly achieved. Alternatively, the continued rotational drive of the spindle counter to the first sense of rotation can be performed from said point of time onward until a certain number of revolution count pulses is reached, which for example is sensed by the above described Hall sensor. The certain number of revolution count pulses, in turn, is specified in such a manner that, at a given reduction of the speed of the electric motor, it results in the desired distance between the nut and the brake piston.

It is of particular advantage if, in the previously explained method, both the speed and the current consumption of the electric motor are utilized for controlling because this results in a certain redundancy. In a properly functioning brake, the break points in the time characteristics of the speed and the current consumption of the electric motor each must occur nearly simultaneously. Potential malfunctions can thus be detected early by monitoring the two parameters.

According to a preferred embodiment of the method for operating the vehicle brake as a hand brake according to the invention, one average value each is formed from several of the speed and/or current consumption reference values stored in the memory in order to compensate for tolerances which can occur due to normal wear as well as due to temperature fluctuations. The averaging can for example be effected over a certain number of actuations, but continuously as well.

In a particularly preferred manner, the method according to the invention is developed further in that the maximum current consumption of the electric motor, representing a certain clamping force, is automatically varied as a function of one or several parameters. For example, the clamping force can, in this manner, be automatically adapted to the vehicle load and/or the inclination or the steepness, respectively, of the roadway, because it is reasonable that with a level roadway or an empty vehicle a lower clamping force for blocking same is required.

A generic vehicle brake, besides its normal function as a hydraulic service brake, however, is capable of being employed not only as a hand brake, but also as an emergency brake. For this purpose, the spindle of the spindle/nut arrangement is driven by the electric motor in a first sense of rotation similarly to the approach in the employment as a hand brake in such a manner that the nut is moved towards the brake piston and eventually contacts the brake piston. The spindle is then further rotationally driven in the first sense of rotation by means of which the brake piston is displaced and the friction member is moved into contact with the rotor to be braked. The vehicle deceleration which is thereby achieved is then compared to a specified minimum deceleration. For this purpose, e.g. the vehicle deceleration which is determined anyway in an anti-slip brake control system (ABS system) which is installed as standard in most road vehicles today, can be utilized, while the specified minimum deceleration can, e.g. be a statutorily specified minimum deceleration. The spindle is then, with the aid of an electronic control unit which can be combined e.g. with the control unit of the brake pressure regulating system, rotationally driven as a function of the result of the previously performed comparison between the momentary vehicle deceleration and the specified minimum deceleration in the first sense of rotation or counter thereto in a controlled manner in such a way that, on the one hand, the value does not drop below the specified minimum deceleration and, on the other hand, the vehicle wheels do not block. In an emergency situation, for example, a failure of the hydraulic actuation of the vehicle brake, a vehicle can be brought to a standstill in this manner with at least the specified minimum deceleration. Such a metered operation of the vehicle brake according to the invention can also be used for facilitating hill climbing in that initially a rolling back of the vehicle is prevented by the already described blocking function of the brake (so-called "hillholder" function) and that upon starting, the brake is released slowly and controlled in a manner corresponding to the velocity increase of the vehicle.

According to a preferred further development of the previously described method a control means, e.g. the already mentioned control unit, which cooperates with the vehicle brake(s) permits the execution of the method in a vehicle brake only if both the vehicle wheel associated with this vehicle brake as well as the diagonally opposite vehicle wheel are rotating. If two diagonally opposite vehicle wheels are rotating, this means that the vehicle is moving. The previously mentioned control is necessary, for example, to enable a function check of the hand brake in a brake test stand wherein the wheels of one vehicle axle are rotationally driven.

One embodiment of the vehicle brake according to the invention together with a method for operating the vehicle brake will be described in more detail in the following with reference to the attached schematic figures, in which:

DETAILED DESCRIPTION OF THE PREFERRED EMBODIMENTS

Figure 1:
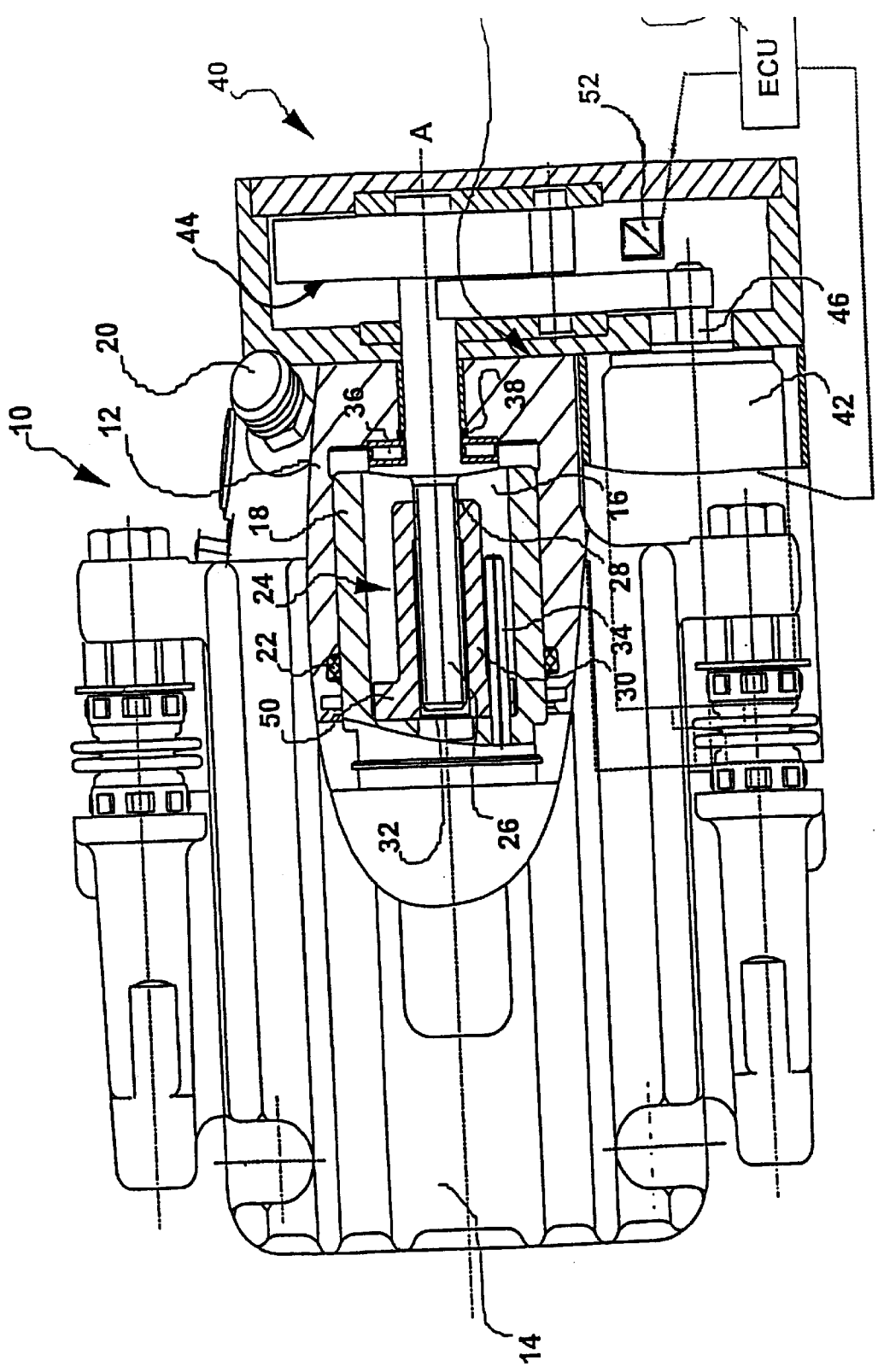
FIG. 1 shows the partially broken away plan view of a hydraulic vehicle brake according to the invention with blocking and emergency braking function.

The vehicle brake shown in FIG. 1 and generally identified by 10 is designed here as a floating caliper disk brake which in a known manner comprises a housing 12 at which a floating caliper 14 is integrally formed which straddles a brake disk not shown herein.

In the housing 12 a hydraulic chamber 16 is located which sealingly accommodates a brake piston 18 which can slide along its longitudinal center axis A. For supplying the hydraulic chamber 16 with hydraulic fluid, a connection 20 is provided at the outside of the vehicle brake 10, which is connected with a brake pressure generator unit not shown herein, e.g. a brake booster/master cylinder unit which can be actuated via a brake pedal. Upon actuation of the brake pressure generator unit the hydraulic fluid in the hydraulic chamber 16 is pressurized so that the brake piston 18 moves to the left along the axis A in order to bring friction pads (not shown) into frictional engagement with the brake disk (also not shown). Upon the termination of the actuation of the brake pressure generator unit, hydraulic fluid can flow back from the hydraulic chamber 16 towards the brake pressure generator unit so that the brake piston 18 moves back along the axis A in order to disengage the friction pads from the brake disk. A radially circumferential sealing element identified by 22 which seals the brake piston 18 in the hydraulic chamber 16 aids in the resetting of the brake piston 18 in that it subjects the brake piston 18 to an elastic resetting force according to the "rollback" principle. The just described function of the disk brake 10 which is caused by a hydraulic actuation as well as its further constructional design is well known to those with skill in that area and therefore need not be described in more detail.

In order to enable the shown vehicle brake 10 to not only fulfil the previously explained function of a hydraulic service brake, but also to be used as a parking or hand brake, a spindle/nut arrangement generally identified by 24 is provided which comprises a spindle 26 arranged coaxially to the axis A and having a male thread 28 and an essentially sleeve-shaped nut 30 which is provided with a female thread 32 matching the male thread 28.

The purpose of the spindle/nut arrangement 24 is to convert a rotational movement of the spindle 26 into a translational movement of the nut 30 which, to this end, is prevented from rotation by means of a guide pin 34 engaging same, secured at the brake piston 18 and projecting from same parallel to the axis A. As can clearly be seen from FIG. 1, the brake piston 18 is designed as a hollow piston which is open at its right side, and the spindle/nut arrangement 24 is mostly accommodated in the hollow brake piston 18 and thus in the hydraulic chamber 16. The spindle 26 is supported in the housing 12 and rotatably supported by means of a bearing 26. A shaft seal 38 seals the spindle 26 in the housing 12 in order to ensure the tightness of the hydraulic chamber 16.

The rotational drive of the spindle 26 is provided by a unit generally identified by 40 which consists of an electric motor 42 and a reduction gear 44 coupled therewith, which in turn is operatively coupled with the end section of the spindle 26 protruding from the housing 12. The reduction gear 44 has an overall reduction of 200:1 so that a relatively small electric motor 42 may be chosen and nevertheless a sufficiently high clamping force is ensured. The unit 40 of electric motor 42 and reduction gear 44 is a subassembly which can be handled separately and which can be combined not only with the illustrated disk brake 10 but also with other disk brakes. The electric motor 42 is arranged in such a manner that its output shaft 46 extends parallel to the axis A and exits the housing of the electric motor 42 at the side facing away from the brake piston 18. This arrangement is particularly space-saving and, in addition, allows the installation of the unit 40 at the housing 12 of the vehicle brake 10 relative to the surface B in any desired angular position. An adaptation to specified restrictions which may e.g. result from chassis components located near the vehicle brake 10 can therefore be made in a simple manner.

Now the brake blocking function of the illustrated vehicle brake 10 will be described: For blocking, the electric motor 42 is first driven by an electronic control unit 48 in such a manner that its output shaft 46 rotates in a first direction. The rotation of the output shaft 46 is transferred via the reduction gear 44 to the spindle 26 which therefore also rotates in a first direction in which an extension of the spindle/nut arrangement 24 is effected by backing-off the nut 30. The nut 30, with reference to FIG. 1, is thus translatorily moved to the left along the axis A, and with its annular flange 50 comes into contact with the bottom of the brake piston 18. With a continued rotation of the spindle 26 in the first sense of rotation the nut 30 urges the brake piston 18 to the left so that the latter urges the friction pad (not shown) against the brake disk (also not shown). With this condition reached, the electric motor 42 can be switched off. Due to the fact that the mating threads of the two threads 28 and 32 are self-locking the achieved position of the spindle/nut arrangement 24 is maintained even after shutting down the electric motor 42.

For releasing the parking brake the electric motor 42 is driven by the control unit 48 in such a manner that its output shaft 46 rotates in the opposite direction. This rotation is in turn transferred to the spindle 26 so that it also rotates opposite to the first sense of rotation and is screwed into the nut 30, whereby the nut 30 is translatorily moved to the right along the axis A. The brake piston 18 is thus relieved of pressure and can subsequently also return to the right so that the friction pads clear the brake disk.

In order to enable the blocked vehicle brake 10 to be released also without the motor/gear unit 40, for example, the spindle 26 or the output shaft 46 of the electric motor 42 as well can be accessible from the outside so that by means of a plug-on crank the nut 30 can be moved to the right by a corresponding rotation. Such a manual resetting of the nut 30 may also be required when changing the friction pads.

In order to ensure an optimum function of the vehicle brake 10, a distance X between the nut 30 and the bottom of the brake piston 18 must not exceed a certain value in the non-actuated condition of the vehicle brake 10. In practical use, a distance X of 0.5 mm is considered optimal. Maintaining this distance X is required on the one hand to achieve the desired maximum clamping force of the hand brake in a time period as short as possible, i.e. within approx. 1 sec. On the other hand, the resetting of the brake piston after a hydraulic service braking operation shall not be impeded by the brake piston 18 prematurely contacting the nut 30, because otherwise a residual sliding moment between the rotating brake disk and the friction pads might result.

In the following a method for operating the vehicle brake 10 as a hand brake will be described with reference to FIG. 2, by means of which an exact adjustment of the distance X is ensured.

Figure 2A:
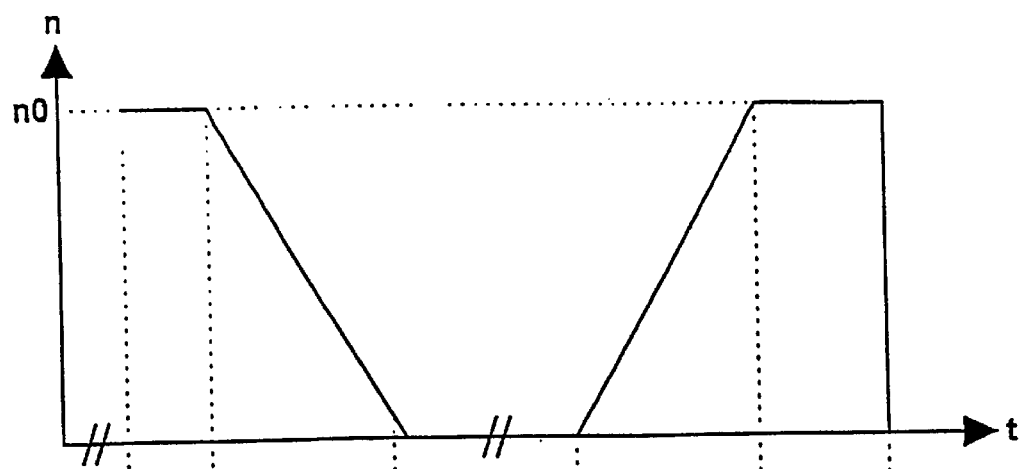
FIGS. 2A–2C show diagrams illustrating a method for operating the vehicle brake shown in FIG. 1 as a hand brake.
Figure 2B:
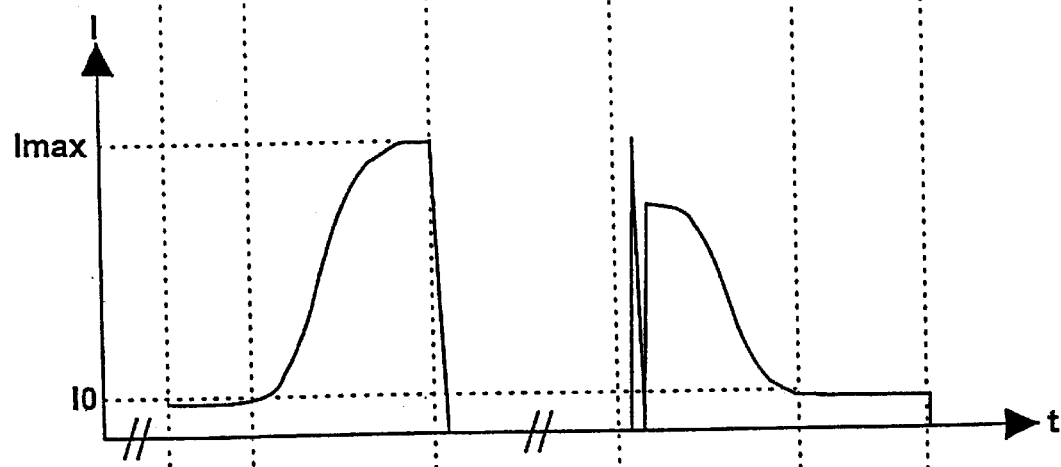
Figure 2C:
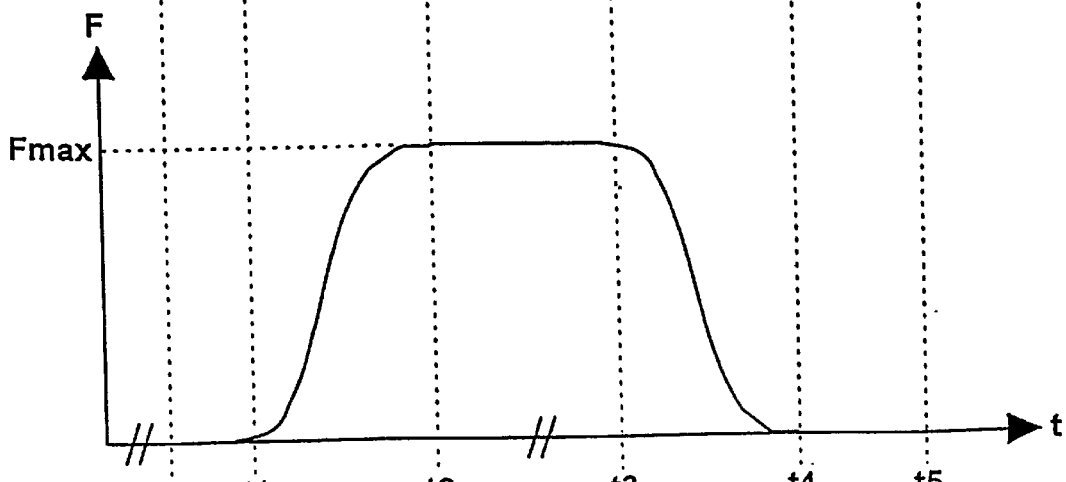

FIG. 2A shows the speed n of the output shaft 46 of the electric motor 42 as a function of time; in FIG. 2B the current consumption I of the electric motor 42 as a function of time, and in FIG. 2C the clamping force F of the vehicle brake 10 as a function of time is plotted, with the time scale in FIGS. 2A, 2B, and 2C each being identical.

For blocking the vehicle brake 10 by means of the spindle/nut arrangement 24, the nut 30 must first be moved into contact with the brake piston 18 by means of rotating the spindle 26 driven by the electric motor 42. From FIGS. 2A to 2C it can be seen that from the point of time to, i.e. from the point of time in which the control unit 48 receives the command to mechanically block the vehicle brake 10, to the point of time $t_1$, the electric motor 42 is operated at a nearly constant high speed and a nearly constant low current consumption because no clamping force has to be applied yet.

When, in time $t_1$, the nut 30 comes into contact with the bottom of the brake piston 18, this can be determined by a break in the characteristics of the speed n as well as of the current consumption I. The values for speed and current consumption applicable before the break are stored as reference values no and $I_0$ in a memory of the control unit 48. As can be seen from the diagrams, the speed n of the electric motor 42 decreases rapidly from the time $t_1$ and, correspondingly thereto, the current consumption I together with the clamping force F increases distinctly until in time $t_2$ the desired clamping force $F_{max}$ is reached. The electric motor 42 is now switched off and, accordingly, the speed n and the current I assume the value 0. The clamping force remains at the value $F_{max}$ because of the self-locking design of the spindle/nut arrangement 24. If the parking brake is released later, namely in time $t_3$, by switching on the electric motor 42, this can first be seen by a switch-on surge pulse in the characteristics of the current consumption I, upon which the latter decreases nearly proportionally with the clamping force F, while the speed n simultaneously increases accordingly. During this phase the speed n and the current I are continuously compared with the reference values no and $I_0$ which have previously been stored in the control unit until in time $t_4$ the speed n and the current I are equal to the reference values no and $I_0$, respectively. This means that the nut 30 starts to no longer be in contact with the bottom of the brake piston 18, i.e. that no clamping force F is present. For this reason, a nearly constant low current I and a nearly constant high speed n will be obtained again from the point of time $t_4$ onward until in time $t_5$ the desired distance X between the nut 30 and the bottom of the brake piston 18 is reached, whereupon the electric motor 42 is switched off.

Because of the known reduction ratio between the output shaft 46 of the electric motor 42 and the spindle 26 the desired distance X can be set simply by appropriately selecting the time interval between points of time $t_4$ and $t_5$. In the illustrated embodiment, however, a Hall sensor 52 is employed which measures the revolutions per time of the output shaft 46 of the electric motor 42. This Hall sensor 52 is directed towards an output pinion not specifically shown which is coupled secured against rotation with the free end of the output shaft 46 of the electric motor 42, and provides a number of square wave pulses per revolution of the output pinion, which number corresponds to the number of teeth of the output pinion and which are processed as revolution count pulses by the control unit 48. Due to the fact that the correlation between the rotational movement of the output shaft 46 and the translational movement of the nut 30 at a given reduction is known, the desired distance X can be adjusted very precisely by specifying a certain number of revolution count pulses.

Starting with the point of time $t_4$, all that has to be done to this end is to add-up the predetermined number of revolution count pulses in a counter, and the electric motor 42 is switched off upon reaching the predetermined number.

What is claimed is:

1. A hydraulic vehicle brake comprising a housing and a brake piston arranged therein, which acts upon a friction member and which, by means of hydraulic pressure which can be supplied into a hydraulic chamber cooperating with the brake piston, can be moved into an actuating position in which it presses the friction member against a rotor of the vehicle brake, and having a spindle/nut arrangement driven by an electric motor, the spindle/nut arrangement arranged coaxially to a center axis of the brake piston, for the mechanical blocking of the brake piston in the actuating position, the nut of the spindle/nut arrangement is secured against rotation and, by rotation of the spindle, can either be moved into contact with the brake piston or moved away from the brake piston translatorily depending on the sense of rotation, with a reduction gear being connected between the electric motor and the spindle, characterized in that the reduction gear is designed to be multi-stage, in particular two-stage, and that one gear stage is designed as a belt gear, in particular, as a toothed-belt gear;

the electric motor is arranged laterally adjacent to the vehicle brake housing in such a manner, that an output shaft of the electric motor extends at a lateral distance parallel to the center axis and exits from the electric motor at a side facing away from the brake piston;

the electric motor and the reduction gear are designed as a subassembly which can be handled separately; and the subassembly can be mounted at the housing in any angular position with respect to a surface of same.

2. The vehicle brake according to claim 1, characterized in that the spindle/nut arrangement is self-locking.

3. The vehicle brake according to claim 1, characterized in that the spindle/nut arrangement is arranged in the hydraulic chamber, in particular in a brake piston designed as a hollow piston, which is open at one side.

4. The vehicle brake according to claim 1, characterized in that the reduction gear is selected from the group comprising a planetary gear, a harmonic drive gear, an eccentric disk gear, or a swash plate gear.

5. The vehicle brake according to claim 1, characterized in that the translational movement of the nut is sensed by means of a sensor.

6. The vehicle brake according to claim 5, characterized in that the sensor is a Hall sensor which measures the revolutions of the output shaft of the electric motor which rotationally drives the spindle.

7. A method for operating a hydraulically actuable vehicle brake system as an emergency brake upon failure of the hydraulic actuation, the system comprising a plurality of wheel brakes, each wheel brake comprising a brake piston which acts upon a friction member and which, by means of hydraulic pressure which can be supplied into a hydraulic chamber cooperating with the brake piston, can be moved into an actuating position in which it presses the friction member against a rotor of the vehicle brake, and having a spindle/nut arrangement driven by an electric motor, which arrangement is arranged coaxially to a center axis of the brake piston, for the mechanical blocking of the brake piston in the actuating position, the nut of said arrangement is secured against rotation and, by rotation of the spindle, can either be moved into contact with the brake piston or moved away from the brake piston translatorily depending on the sense of rotation, characterized by the steps of:

rotationally driving the spindle by means of an electric motor in a first sense of rotation in such a manner that the nut of the spindle/nut arrangement comes into contact with the brake piston;

further rotationally driving the spindle in the first sense of rotation and comparing the achieved vehicle deceleration with a specified minimum deceleration; and rotationally driving the spindle in a controlled manner in the first sense of rotation or opposite thereto depending on the result of the previously performed comparison in such a manner that the achieved vehicle deceleration does not fall below the specified minimum deceleration;

characterized in that a controlling means which cooperates with the vehicle brakes permits the execution of the method only if the vehicle wheels which are associated to two diagonally opposite vehicle brakes are rotating.

8. A method for operating a hydraulic vehicle brake as a hand brake comprising a brake piston which acts upon a friction member and which, by means of hydraulic pressure which can be supplied into a hydraulic chamber cooperating with the brake piston, can be moved into an actuating position in which it presses the friction member against a rotor of the vehicle brake, and having a spindle/nut arrangement driven by an electric motor, which arrangement is arranged coaxially to a center axis of the brake piston, for the mechanical blocking of the brake piston in the actuating position, the nut of said arrangement is secured against rotation and, by rotation of the spindle, can either be moved into contact with the brake piston or moved away from the brake piston translatorily depending on the sense of rotation, said method comprising the following steps:

rotationally driving the spindle by means of an electric motor in a first sense of rotation in such a manner that the nut of the spindle/nut arrangement is moved towards the brake piston, characterized by the steps of:

measuring the speed n and the current consumption I of the electric motor as a function of time;

sensing a sudden speed drop and a corresponding increase in the current consumption and storing the previously applicable value of speed and/or current consumption as (a) reference value(s) $n_o$ or $I_o$, respectively, in a memory;

further rotationally driving the spindle in the first sense of rotation until a specified maximum current consumption Imax is reached which corresponds to a predetermined clamping force and subsequently switching off the electric motor;

rotationally driving the spindle in a second sense of rotation opposite to the first sense of rotation and comparing the momentary speed n and/or the momentary current consumption I with the reference value $n_o$ or $I_o$ respectively;

sensing a point of time (t4) in which $n=n_o$ and/or $I=I_o$ applies; and further rotationally driving the spindle in the second sense of rotation for setting a specified distance between the nut and the brake piston.

9. The method according to claim 8, characterized in that the further rotationally driving of the spindle in the second sense of rotation from the point of time (t4) onward is effected for a specified duration of time which corresponds to the desired distance.

10. The method according to claim 8, characterized in that the further rotationally driving of the spindle in the second sense of rotation from the point of time (t4) onward is continued until a certain number of revolution count pulses is reached which corresponds to the desired distance.

11. The method according to claim 8, characterized in that an average value $N_{om}$, and/or $I_{om}$ is formed from a number of the reference values $n_o$ and/or $I_o$ stored in the memory.

12. The method according to claim 8, characterized in that the specified maximum current consumption Imax is automatically varied as a function of parameters, in particular, as a function of the vehicle load and/or the steepness of the road surface.

* * * * *